(12) United States Patent
Iwata

(10) Patent No.: US 10,577,445 B2
(45) Date of Patent: Mar. 3, 2020

(54) POLISHING COMPOSITION FOR MAGNETIC DISK SUBSTRATE

(71) Applicant: YAMAGUCHI SEIKEN KOGYO CO., LTD., Aichi (JP)

(72) Inventor: Toru Iwata, Aichi (JP)

(73) Assignee: YAMAGUCHI SEIKEN KOGYO CO., LTD. (JP)

( * ) Notice: Subject to any disclaimer, the term of this patent is extended or adjusted under 35 U.S.C. 154(b) by 0 days.

(21) Appl. No.: 16/169,668

(22) Filed: Oct. 24, 2018

(65) Prior Publication Data

US 2019/0119423 A1  Apr. 25, 2019

(51) Int. Cl.
| | | |
|---|---|---|
| *C09G 1/00* | (2006.01) | |
| *C09G 1/02* | (2006.01) | |
| *C09G 1/04* | (2006.01) | |
| *C08F 220/06* | (2006.01) | |
| *C08F 220/14* | (2006.01) | |
| *C08F 220/56* | (2006.01) | |
| *C08F 228/02* | (2006.01) | |
| *G11B 23/50* | (2006.01) | |
| *C08K 3/36* | (2006.01) | |

(52) U.S. Cl.
CPC .......... *C08F 220/06* (2013.01); *C08F 220/14* (2013.01); *C08F 220/56* (2013.01); *C08F 228/02* (2013.01); *C08K 3/36* (2013.01); *G11B 23/505* (2013.01); *C08F 2800/10* (2013.01); *C08K 2201/005* (2013.01); *G11B 2220/2508* (2013.01)

(58) Field of Classification Search
CPC .............. C09G 1/00; C09G 1/02; C09G 1/04
See application file for complete search history.

(56) References Cited

U.S. PATENT DOCUMENTS

| | | | |
|---|---|---|---|
| 6,261,476 B1 | 7/2001 | Kwok et al. | |
| 2002/0102923 A1 | 8/2002 | Sugiyama et al. | |
| 2003/0029095 A1 | 2/2003 | Ishitobi et al. | |
| 2003/0121214 A1 | 7/2003 | Ishibashi | |
| 2004/0186206 A1* | 9/2004 | Yoneda | C08K 3/36 524/95 |
| 2009/0042485 A1 | 2/2009 | Yamaguchi | |
| 2009/0111359 A1 | 4/2009 | Suzuki et al. | |
| 2010/0009537 A1 | 1/2010 | Balasubramaniam et al. | |
| 2011/0203186 A1* | 8/2011 | Oshima | B24B 37/044 51/298 |
| 2012/0045974 A1 | 2/2012 | Nakanishi et al. | |
| 2014/0335763 A1 | 11/2014 | Oshima et al. | |

(Continued)

FOREIGN PATENT DOCUMENTS

| | | | |
|---|---|---|---|
| JP | 2001260005 A | 9/2001 | |
| JP | 2002167575 A | 6/2002 | |
| JP | 2003510446 A | 3/2003 | |

(Continued)

*Primary Examiner* — Thomas T Pham
(74) *Attorney, Agent, or Firm* — Bracewell LLP; Brad Y. Chin

(57) ABSTRACT

Embodiments relate to a polishing composition is an aqueous composition containing at least colloidal silica, wet-process silica particles, and a water-soluble polymer compound. The water-soluble polymer compound is a copolymer containing a monomer having a carboxylic acid group, a monomer having an amide group, and a monomer having a sulfonic acid group as essential monomers.

12 Claims, 1 Drawing Sheet

(56) References Cited

U.S. PATENT DOCUMENTS

2019/0062595 A1* 2/2019 Taniguchi ................ C09G 1/02

FOREIGN PATENT DOCUMENTS

| JP | 2003160781 A | 6/2003 |
|----|--------------|--------|
| JP | 2007063372 A | 3/2007 |
| JP | 2009176397 A | 8/2009 |
| JP | 2010167553 A | 8/2010 |
| JP | 2011204327 A | 3/2011 |
| JP | 2011527643 A | 11/2011 |
| JP | 2012043493 A | 3/2012 |
| JP | 2012155785 A | 8/2012 |
| JP | 2014029754 A | 2/2014 |
| JP | 2014029755 A | 2/2014 |

* cited by examiner

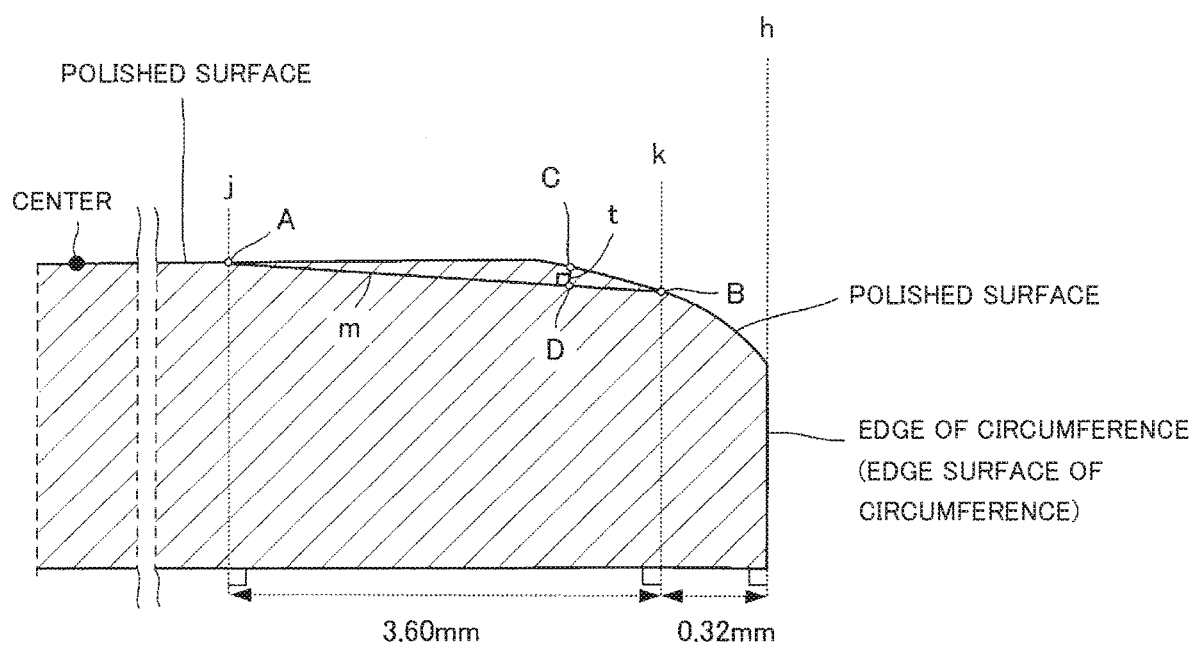

POLISHING COMPOSITION FOR MAGNETIC DISK SUBSTRATE

CROSS REFERENCE TO RELATED APPLICATIONS

This application claims the benefit of and priority to Japanese Patent Application No. JP-2017-205055, filed on Oct. 24, 2017, with Japanese Patent Office, the entire contents of which are incorporated herein by reference.

BACKGROUND

Field

Embodiments relate to a polishing composition used for polishing an electronic component such as a semiconductor or a magnetic recording medium including a hard disk. Particularly, embodiments relate to a polishing composition used for polishing a surface of a substrate for a magnetic recording medium such as a glass magnetic disk substrate or an aluminum magnetic disk substrate. Furthermore, embodiments relate to a polishing composition used for polishing a surface of an aluminum magnetic disk substrate for a magnetic recording medium having an electroless nickel-phosphorus plated film formed on a surface of an aluminum alloy substrate.

Description of the Related Art

Conventionally, as a polishing composition for polishing an electroless nickel-phosphorous plated film surface of an aluminum magnetic disk substrate, a polishing composition obtained by dispersing alumina particles having a relatively large particle size capable of realizing a high polishing rate in water has been used from a viewpoint of productivity. However, in a case of using alumina particles, the alumina particles have a considerably higher hardness than the electroless nickel-phosphorus plated film of the aluminum magnetic disk substrate. Therefore, alumina particles are embedded in the substrate, and the embedded particles have a bad influence on a subsequent polishing step disadvantageously.

As a solution to such a problem, a polishing composition combining alumina particles and silica particles has been proposed (Patent Documents 1 to 4 and the like). Furthermore, a polishing method only with silica particles without using alumina particles has been proposed (Patent Documents 5 to 9). Furthermore, an additive for reducing edge rounding (roll-off) of a substrate in a case where polishing is performed only with silica particles has been studied (Patent Documents 10 to 14).

[Patent Document 1] JP-A-2001-260005
[Patent Document 2] JP-A-2009-176397
[Patent Document 3] JP-A-2011-204327
[Patent Document 4] JP-A-2012-43493
[Patent Document 5] JP-A-2010-167553
[Patent Document 6] JP-A-2011-527643
[Patent Document 7] JP-A-2014-29754
[Patent Document 8] JP-A-2014-29755
[Patent Document 9] JP-A-2012-155785
[Patent Document 10] JP-A-2002-167575
[Patent Document 11] JP-A-2003-160781]
[Patent Document 12] JP-A-2003-510446
[Patent Document 13] JP-A-2007-63372
[Patent Document 14] JP-A-2007-130728

SUMMARY

By combining alumina particles and silica particles as in Patent Documents 1 to 4, it is possible to remove alumina particles embedded in a substrate to some extent. However, as long as the polishing composition containing alumina particle is used, a possibility that the alumina particles contained in the polishing composition will be embedded in a substrate still remains. In addition, such a polishing composition contains both alumina particles and silica particles. Therefore, properties possessed by the particles are mutually canceled and a polishing rate and surface smoothness are deteriorated disadvantageously.

Therefore, a polishing method only with silica particles without using alumina particles has been proposed. Patent Documents 5 and 6 propose a combination of colloidal silica and a polishing accelerator. Patent Documents 7 and 8 have proposed a polishing method with colloidal silica, fumed silica, surface-modified silica, silica manufactured by a water glass process, or the like, and a method using colloidal silica having a special shape. However, with these methods, a polishing rate is insufficient, and improvement is demanded. In addition, Patent Document 9 proposes a method for achieving a polishing rate close to that of alumina particles by using crushed silica particles. However, with this method, there is a problem that surface smoothness is deteriorated, and improvement is demanded.

In the polishing method only with silica particles, there is a problem that roll-off is larger than in a case where alumina particles are used. Various additives have also been studied for reducing roll-off. For example, addition of a nonionic surfactant (Patent Documents 10 and 11), addition of a cellulose derivative (Patent Document 12), and addition of an alkylbenzene sulfonic acid-based surfactant or a polyoxyethylene sulfate-based surfactant (Patent Document 13 and 14) have been proposed. However, reduction in roll-off is observed due to these additives, but an effect thereof is insufficient depending on compatibility with silica particles. In addition, a polishing rate is significantly lowered disadvantageously.

The various embodiments described herein have been achieved in view of such a problem of the conventional art discussed above. An object of the various embodiments is to provide a polishing composition capable of realizing a high polishing rate and simultaneously realizing favorable surface smoothness and roll-off without using alumina particles.

As a result of intensive studies to solve the above problems, the present inventors have found that by combining colloidal silica with wet-process silica particles formed through a pulverization step and adding a specific water-soluble polymer compound, an unexpectedly high polishing rate and favorable surface smoothness can be achieved, thus completing the present invention. Thus, the various embodiments provide the following polishing composition for a magnetic disk substrate.

According to at least one embodiment, there is provided a polishing composition for a magnetic disk substrate, including colloidal silica, pulverized wet-process silica particles, a water-soluble polymer compound, and water, in which the water-soluble polymer compound is a copolymer containing a monomer having a carboxylic acid group, a monomer having an amide group, and a monomer having a sulfonic acid group as essential monomers.

According to at least one embodiment, the colloidal silica has an average particle size (D50) of 5 to 200 nm, and the wet-process silica particles have an average particle size of 0.2 to 1.0 μm.

According to at least one embodiment, a value of a ratio of the average particle size of the wet-process silica particles with respect to the average particle size of the colloidal silica is from 2.0 to 30.0.

According to at least one embodiment, a total concentration of the colloidal silica and the wet-process silica particles is from 1 to 50% by mass, and a ratio of the colloidal silica is from 5 to 95% by mass and a ratio of the wet-process silica particles is from 5 to 95% by mass with respect to the total mass of the colloidal silica and the wet-process silica particles.

According to at least one embodiment, the water-soluble polymer compound has a ratio of structural units derived from the monomer having a carboxylic acid group of 50 to 95 mol %, a ratio of structural units derived from the monomer having an amide group of 1 to 40 mol %, and a ratio of structural units derived from the monomer having a sulfonic acid group of 0.01 to 20 mol %.

According to at least one embodiment, the monomer having a carboxylic acid group is selected from the group consisting of acrylic acid, an acrylate, methacrylic acid, and a methacrylate.

monomer having an amide group is at least one selected from the group consisting of acrylamide, methacrylamide, N-alkylacrylamide, and N-alkylmethacrylamide.

According to at least one embodiment, the monomer having a sulfonic acid group is selected from the group consisting of isoprenesulfonic acid, 2-acrylamide-2-methylpropanesulfonic acid, 2-methacrylamide-2-methylpropane sulfonic acid, styrenesulfonic acid, vinylsulfonic acid, allylsulfonic acid, isoamylenesulfonic acid, vinylnaphthalenesulfonic acid, and salts thereof.

According to at least one embodiment, the water-soluble polymer compound has a weight average molecular weight of 1,000 to 1,000,000.

According to at least one embodiment, the water-soluble polymer compound has a content of 0.0001 to 2.0% by mass.

According to at least one embodiment, the polishing composition further including at least one of an acid and a salt thereof, and having a pH value at 25° C. of 0.1 to 4.0.

According to at least one embodiment, the polishing composition further including an oxidizer.

According to at least one embodiment, the polishing composition is used for polishing an electroless nickel-phosphorus plated aluminum magnetic disk substrate.

By using a combination of two kinds of silica particles for polishing a surface of an aluminum magnetic disk substrate for a magnetic recording medium in which an electroless nickel-phosphorus plated film is formed on a surface of an aluminum alloy substrate, and further adding a specific water-soluble polymer compound, the polishing composition for a magnetic disk substrate according to various embodiments can achieve a high polishing rate and favorable surface smoothness.

BRIEF DESCRIPTION OF DRAWINGS

FIG. 1 is a view for describing measurement of roll-off in a case where a surface of a substrate is polished.

DETAILED DESCRIPTION

Hereinafter, various embodiments will be described. It should be understood that matters obtained by performing modification of the various embodiments, improvement thereof, or the like appropriately within a range not departing from the gist of the present invention based on usual knowledge of a person skilled in the art are also included in the scope of the various embodiments.

1. Polishing Composition

A polishing composition for a magnetic disk substrate according to an embodiment is an aqueous composition containing at least colloidal silica, wet-process silica particles, and a water-soluble polymer compound. The water-soluble polymer compound is a copolymer containing a monomer having a carboxylic acid group, a monomer having an amide group, and a monomer having a sulfonic acid group as essential monomers. The colloidal silica preferably has an average particle size (D50) of 5 to 200 nm. The wet-process silica particles preferably have an average particle size of 0.2 to 1.0 μm. A value of a ratio (B/A) of an average particle size (B) of the wet-process silica particles with respect to an average particle size (A) of the colloidal silica is preferably from 2.0 to 30.0. Here, the wet-process silica particles are pulverized by pulverization in a process for manufacturing the wet-process silica particles. That is, the process for manufacturing the wet-process silica particles includes a pulverization step.

(1) Colloidal Silica

The colloidal silica contained in the polishing composition for a magnetic disk substrate according to an embodiment preferably has an average particle size (D50) of 5 to 200 nm. The average particle size (D50) of 5 nm or more can suppress reduction in polishing rate. The average particle size (D50) of 200 nm or less can suppress deterioration of surface smoothness. The average particle size (D50) of the colloidal silica is more preferably from 10 to 150 nm, and still more preferably from 20 to 120 nm.

As the shape of the colloidal silica, a spherical shape, a chain shape, a kompeito-typed shape (like particles having convexes on the surface), a heteromorphic shape, or the like is known, and primary particles are monodispersed in water to form a colloidal state. As the colloidal silica used in the present invention, spherical or approximately spherical colloidal silica is particularly preferable. By using spherical or approximately spherical colloidal silica, surface smoothness can be further improved. The colloidal silica is obtained by a water glass process for growing a particle by a condensation reaction of sodium silicate or potassium silicate as a raw material in an aqueous solution, an alkoxysilane process for growing a particle by an acid or alkali hydrolysis condensation reaction of an alkoxysilane such as tetraethoxy silane, or the like.

(2) Wet-Process Silica Particles

Wet-process silica particles used in the various embodiments refer to particles prepared from wet-process silica obtained as precipitated silicic acid by adding an alkali silicate aqueous solution and an inorganic acid or an inorganic acid aqueous solution to a reaction vessel. The wet-process silica particles do not include the above-described colloidal silica.

Examples of the alkali silicate aqueous solution which is a raw material of the wet-process silica include a sodium silicate aqueous solution, a potassium silicate aqueous solution, and a lithium silicate aqueous solution, but in general, a sodium silicate aqueous solution is preferably used. Examples of the inorganic acid include sulfuric acid, hydrochloric acid, and nitric acid, but in general, sulfuric acid is preferably used. After completion of a reaction, a reaction solution is filtered, washed with water, and then dried with a dryer such that the water content is 6% or less. The dryer may be any one of a stationary dryer, a spray dryer, and a fluidized dryer. Thereafter, the dried product is pulverized with a pulverizer such as a jet mill, and is further classified to obtain wet-process silica particles.

According to at least one embodiment, the particle shape of each of the wet-process silica particles pulverized by pulverization as described above has a corner portion, and has higher polishing ability than particles having an approximately spherical shape.

According to at least one embodiment, the wet-process silica particles have an average particle size preferably of 0.2 to 1.0 µm, more preferably of 0.2 to 0.8 µm, still more preferably of 0.2 to 0.6 µm. The average particle size of 0.2 µm or more can suppress reduction in polishing rate. The average particle size of 1.0 µm or less can suppress deterioration of surface smoothness.

According to at least one embodiment, the value of the ratio (B/A) between the average particle size (B) of the wet-process silica particles and the average particle size (A) of the colloidal silica is preferably from 2.0 to 30.0, more preferably from 2.0 to 16.0, still more preferably from 2.5 to 16.0, and particularly preferably from 3.0 to 10.0.

According to at least one embodiment, the value of the ratio in average particle size of 2.0 or more can improve a polishing rate. The value of the ratio in average particle size of 30.0 or less can suppress deterioration of surface smoothness.

According to at least one embodiment, the total concentration of the colloidal silica and the wet-process silica particles is preferably from 1 to 50% by mass, and more preferably from 2 to 40% by mass with respect to the total mass of the polishing composition. The total concentration of the silica particles of 1% by mass or more can suppress reduction in polishing rate. The total concentration of the silica particles of 50% by mass or less can maintain a sufficient polishing rate without using excessive silica particles.

A ratio of the colloidal silica with respect to all the silica particles is preferably from 5 to 95% by mass, and more preferably from 20 to 80% by mass. The ratio of the colloidal silica of 5% by mass or more can suppress deterioration of surface smoothness. The ratio of the colloidal silica of 95% by mass or less can suppress reduction in polishing rate.

A ratio of the wet-process silica particles with respect to all the silica particles is preferably from 5 to 95% by mass, and more preferably from 20 to 80% by mass. The ratio of the wet-process silica particles of 95% by mass or less can suppress deterioration of surface smoothness. The ratio of the wet-process silica particles of 5% by mass or more can suppress reduction in polishing rate.

(3) Water-Soluble Polymer Compound

According to at least one embodiment, the water-soluble polymer compound is a copolymer containing a monomer having a carboxylic acid group, a monomer having an amide group, and a monomer having a sulfonic acid group as essential monomers.

(3-1) Monomer Having Carboxylic Acid Group

As the monomer having a carboxylic acid group, an unsaturated aliphatic carboxylic acid and a salt thereof are preferably used. Specific examples thereof include acrylic acid, methacrylic acid, maleic acid, itaconic acid, and salts thereof. Examples of the salts include a sodium salt, a potassium salt, a magnesium salt, an ammonium salt, an amine salt, and an alkylammonium salt.

(3-2) Monomer Having Amide Group

Examples of the monomer having an amide group include acrylamide, methacrylamide, N-alkylacrylamide, and N-alkylmethacrylamide. One or more kinds can be selected from these monomers to be used as a monomer. For example, acrylamide and N-alkylacrylamide may be selected to be used in combination. Methacrylamide and N-alkyl methacrylamide may be selected to be used in combination.

Specific examples of N-alkylacrylamide and N-alkylmethacrylamide include N-methylacrylamide, N-ethylacrylamide, N-n-propylacrylamide, N-iso-propylacrylamide, N-n-butylacrylamide, N-iso-butylacrylamide, N-sec-butylacrylamide, N-tert-butylacrylamide, N-methylmethacrylamide, N-ethylmethacrylamide, N-n-propylmethacrylamide, N-iso-propylmethacrylamide, N-n-butylmethacrylamide, N-iso-butylmethacrylamide, N-sec-butylmethacrylamide, and N-tert-butylmethacrylamide. Among these compounds, N-n-butylacrylamide, N-iso-butylacrylamide, N-sec-butylacrylamide, N-tert-butylacrylamide, N-n-butylmethacrylamide, N-iso-butylmethacrylamide, N-sec-butylmethacrylamide, N-tert-butylmethacrylamide, and the like are preferable.

(3-3) Monomer Having Sulfonic Acid Group

Specific examples of the monomer having a sulfonic acid group include isoprenesulfonic acid, 2-acrylamide-2-methylpropanesulfonic acid, 2-methacrylamide-2-methylpropanesulfonic acid, styrenesulfonic acid, vinylsulfonic acid, allylsulfonic acid, isoamylenesulfonic acid, vinylnaphthalenesulfonic acid, and salts thereof. Preferable examples thereof include 2-acrylamide-2-methylpropanesulfonic acid, 2-methacrylamide-2-methylpropanesulfonic acid, and salts thereof.

(3-4) Copolymer

According to at least one embodiment, the water-soluble polymer compound is preferably a copolymer obtained by combining and polymerizing these monomer components. Preferable examples of a combination for the copolymer include a combination of acrylic acid and/or a salt thereof, N-alkylacrylamide, and a monomer having a sulfonic acid group, a combination of acrylic acid and/or a salt thereof, N-alkylmethacrylamide, and a monomer having a sulfonic acid group, a combination of methacrylic acid and/or a salt thereof, N-alkylacrylamide, and a monomer having a sulfonic acid group, a combination of methacrylic acid and/or a salt thereof, N-alkylmethacrylamide, and a monomer having a sulfonic acid group, a combination of acrylic acid and/or a salt thereof, acrylamide, N-alkylacrylamide, and a monomer having a sulfonic acid group, a combination of acrylic acid and/or a salt thereof, methacrylamide, N-alkylmethacrylamide, and a monomer having a sulfonic acid group, a combination of methacrylic acid and/or a salt thereof, acrylamide, N-alkylacrylamide, and a monomer having a sulfonic acid group, and a combination of methacrylic acid and/or a salt thereof, methacrylamide, N-alkylmethacrylamide, and a monomer having a sulfonic acid group.

A ratio of structural units derived from a monomer having a carboxylic acid group in the water-soluble polymer compound is preferably from 50 to 95 mol %, more preferably from 60 to 93 mol %, and still more preferably from 70 to 90 mol %. A ratio of structural units derived from a monomer having an amide group is preferably from 1 to 40 mol %, more preferably from 3 to 30 mol %, and still more preferably from 5 to 20 mol %. A ratio of structural units derived from a monomer having a sulfonic acid group is preferably from 0.01 to 20 mol %, more preferably from 0.1 to 10 mol %, and still more preferably from 0.2 to 5 mol %.

(3-5) Method for Manufacturing Water-Soluble Polymer Compound

A method for manufacturing the water-soluble polymer compound is not particularly limited, but an aqueous solution polymerization process is preferable. According to the aqueous solution polymerization process, the water-soluble polymer compound can be obtained as a uniform solution.

A polymerization liquid medium in the aqueous solution polymerization is preferably an aqueous liquid medium, and particularly preferably water. In order to improve solubility of the above monomer components in a liquid medium, an organic liquid medium may be added appropriately in a range not having a bad influence on polymerization of the monomers. Examples of the organic liquid medium include an alcohol such as isopropyl alcohol and a ketone such as acetone. These liquid media can be used singly or in combination of two or more kinds thereof.

Hereinafter, a method for manufacturing the water-soluble polymer compound using the above aqueous liquid medium according to various embodiments will be described. In a polymerization reaction, a known polymerization initiator can be used, but a radical polymerization initiator is particularly preferably used.

Examples of the radical polymerization initiator include a persulfate such as sodium persulfate, potassium persulfate, or ammonium persulfate, a hydroperoxide such as t-butyl hydroperoxide, a water-soluble peroxide such as hydrogen peroxide, a ketone peroxide such as methylethyl ketone peroxide or cyclohexanone peroxide, an oil-soluble peroxide such as dialkyl peroxide including di-t-butyl peroxide and t-butyl cumyl peroxide, and an azo compound such as azobisisobutyronitrile or 2,2-azobis(2-methylpropionamidine) dihydrochloride. These peroxide-based radical polymerization initiators may be used singly or in combination of two or more kinds thereof.

Among the above peroxide-based radical polymerization initiators, a persulfate or an azo compound is preferable, and azobisisobutyronitrile is particularly preferable because of easy control of a molecular weight of a generated water-soluble polymer compound.

According to at least one embodiment, the use amount of the radical polymerization initiator is not particularly limited. However, a ratio of the radical polymerization initiator is preferably from 0.1 to 15% by mass, and particularly preferably from 0.5 to 10% by mass based on the total mass of all the monomers of a water-soluble polymer compound. By setting this ratio to 0.1% by mass or more, a copolymerization ratio can be improved. By setting this ratio to 15% by mass or less, stability of a water-soluble polymer compound can be improved.

In some cases, the water-soluble polymer compound may be manufactured using a water-soluble redox-based polymerization initiator. Examples of the redox-based polymerization initiator include a combination of an oxidizer (for example, the above peroxide) and a reducing agent such as sodium bisulfate, ammonium bisulfite, ammonium sulfite, or sodium hydrosulfite, or a combination of an oxidizer and iron alum, potassium alum, or the like.

In manufacturing the water-soluble polymer compound, a chain transfer agent may be added appropriately to a polymerization system in order to adjust a molecular weight. Examples of the chain transfer agent include sodium phosphite, sodium hypophosphite, potassium hypophosphite, sodium sulfite, sodium hydrogen sulfite, mercaptoacetic acid, mercaptopropionic acid, thioglycolic acid, 2-propanethiol, 2-mercaptoethanol, and thiophenol.

A polymerization temperature for manufacturing the water-soluble polymer compound is not particularly limited, but is preferably from 60 to 100° C. By setting the polymerization temperature to 60° C. or higher, a polymerization reaction proceeds smoothly to obtain excellent productivity. By setting the polymerization temperature to 100° C. or lower, coloring can be suppressed.

In addition, the polymerization reaction can be performed under an increased or reduced pressure, but is preferably performed at a normal pressure because of cost of equipment for a reaction under an increased or reduced pressure. Polymerization time is preferably from 2 to 20 hours, and particularly preferably about from 3 to 10 hours.

After the polymerization reaction, neutralization is performed with a basic compound, as necessary. Examples of the basic compound used for neutralization include an alkali metal hydroxide such as sodium hydroxide or potassium hydroxide, an alkaline earth metal hydroxide such as calcium hydroxide or magnesium hydroxide, ammonia water, and an organic amine such as monoethanolamine, diethanolamine, or triethanolamine.

After neutralization or in a case where neutralization is not performed, the water-soluble polymer compound has a pH value at 25° C. preferably of 1 to 13, more preferably of 2 to 9, still more preferably of 3 to 8 in a case where the water-soluble polymer compound has a concentration of 10% by mass.

(3-6) Weight Average Molecular Weight

According to at least one embodiment, the water-soluble polymer compound has a weight average molecular weight preferably of 1,000 to 1,000,000, more preferably of 2,000 to 800,000, still more preferably of 3,000 to 600,000. Note that the weight average molecular weight of the water-soluble polymer compound is measured in terms of polyacrylic acid by gel permeation chromatography (GPC). In a case where the weight average molecular weight of the water-soluble polymer compound is less than 1,000, waviness is deteriorated. In a case where the weight average molecular weight exceeds 1,000,000, an aqueous solution has high viscosity and makes handling difficult.

(3-7) Content

According to at least one embodiment, the water-soluble polymer compound has a content preferably of 0.0001 to 2.0% by mass, more preferably of 0.001 to 1.0% by mass, still more preferably of 0.005 to 0.5% by mass in the polishing composition in terms of solid content. In a case where the content of the water-soluble polymer compound is less than 0.0001% by mass, an effect of adding the water-soluble polymer compound cannot be obtained sufficiently. In a case where the content is more than 2.0% by mass, the effect of adding the water-soluble polymer compound reaches the ceiling, the water-soluble polymer compound is excessively added, and therefore this is not economical.

(4) Acid and/or Salt Thereof

According to at least one embodiment, at least one of an acid and a salt thereof can be used for pH adjustment or as an optional component. Examples of the at least one of the acid and the salt thereof to be used include at least one of an inorganic acid and a salt thereof and at least one of an organic acid and a salt thereof.

Examples of the at least one of the inorganic acid and the salt thereof include an inorganic acid such as nitric acid, sulfuric acid, hydrochloric acid, phosphoric acid, phosphonic acid, pyrophosphoric acid, or tripolyphosphoric acid, and salts thereof.

Examples of the at least one of the organic acid and the salt thereof include an aminocarboxylic acid such as glutamic acid or aspartic acid, and salts thereof, a carboxylic acid such as citric acid, tartaric acid, oxalic acid, nitroacetic acid, maleic acid, malic acid, or succinic acid, and salts thereof, and at least one of an organic phosphonic acid and a salt thereof. These acids and salts thereof can be used singly or in combination of two or more kinds thereof.

The at least one of the organic phosphonic acid and the salt thereof is at least one selected from the group consisting of 2-aminoethyl phosphonic acid, 1-hydroxyethylidene-1,1-diphosphonic acid, aminotri(methylene phosphonic acid), ethylene diaminetetra(methylene phosphonic acid), diethylene triaminepenta(methylene phosphonic acid), ethane-1,1-diphosphonic acid, ethane-1,1,2-triphosphonic acid, ethane-1-hydroxy-1,1,2-triphosphonic acid, ethane-1,2-dicarboxy-1,2-diphosphonic acid, methanehydroxy phosphonic acid, 2-phosphonobutane-1,2-dicarboxylic acid, 1-phosphonobutane-2,3,4-tricarboxylic acid, α-methyl phosphono succinic acid, and salts thereof.

Use of a combination of two or more kinds of the above compounds is also a preferable embodiment. Specific examples thereof include a combination of phosphoric acid and an organic phosphonic acid and a combination of phosphoric acid and an organic phosphonate.

(5) Oxidizer

According to at least one embodiment, an oxidizer can be used as a polishing accelerator. Examples of the oxidizer used include a peroxide, permanganic acid or a salt thereof, chromic acid or a salt thereof, peroxoacid or a salt thereof, halogen oxoacid or a salt thereof, oxoacid or a salt thereof, and a mixture of two or more kinds of these oxidizers.

Specific examples thereof include hydrogen peroxide, sodium peroxide, barium peroxide, potassium peroxide, potassium permanganate, a metal salt of chromic acid, a metal salt of dichromic acid, persulfuric acid, sodium persulfate, potassium persulfate, ammonium persulfate, peroxophosphornic acid, sodium peroxoborate, performic acid, peracetic acid, hypochlorous acid, sodium hypochlorite, and calcium hypochlorite. Among these compounds, hydrogen peroxide, persulfuric acid and a salt thereof, hypochlorous acid and a salt thereof, and the like are preferable, and hydrogen peroxide is more preferable.

According to at least one embodiment, the oxidizer preferably has a content of 0.01 to 10.0% by mass in the polishing composition. The content is more preferably from 0.1 to 5.0% by mass.

2. Physical Properties (pH) of Polishing Composition

The polishing composition according to an embodiment preferably has a pH value at 25° C. of 0.1 to 4.0. The pH value at 25° C. is more preferably from 0.5 to 3.0. The pH value at 25° C. of the polishing composition of 0.1 or more can suppress surface roughness. The pH value at 25° C. of the polishing composition of 4.0 or less can suppress reduction in polishing rate.

The polishing composition according to an embodiment can be used for polishing various electronic components such as a magnetic recording medium including a hard disk. Particularly, the polishing composition can be used preferably for polishing an aluminum magnetic disk substrate. The polishing composition can be more preferably used for polishing an electroless nickel-phosphorus plated aluminum magnetic disk substrate. Electroless nickel-phosphorus plating is usually performed at a pH value at 25° C. of 4 to 6. Nickel tends to be dissolved at a pH value at 25° C. of less than 4, and therefore plating does not proceed easily. Meanwhile, in polishing, for example, nickel tends to be dissolved at a pH value at 25° C. of less than 4.0, and therefore use of the polishing composition according to an embodiment of the present invention can increase a polishing rate.

3. Method for Polishing Magnetic Disk Substrate

The polishing composition according to an embodiment is suitable for use in polishing a magnetic disk substrate such as an aluminum magnetic disk substrate or a glass magnetic disk substrate. Particularly, the polishing composition is suitable for use in polishing an electroless nickel-phosphorus plated aluminum magnetic disk substrate (hereinafter referred to as an aluminum disk).

Examples of a polishing method to which the polishing composition according to an embodiment can be applied include a method for pasting a polishing pad on a surface plate of a polishing machine, supplying a polishing composition to a surface to be polished in a polishing target (for example, an aluminum disk) or the polishing pad, and rubbing the surface to be polished with the polishing pad (called polishing). For example, in a case where front and back surfaces of an aluminum disk are polished simultaneously, a double-side polishing machine in which polishing pads are pasted on an upper surface plate and a lower surface plate is used. In this method, an aluminum disk is sandwiched by polishing pads pasted on an upper surface plate and a lower surface plate, a polishing composition is supplied between a polishing surface and each of the polishing pads, the two polishing pads are rotated simultaneously, and front and back surfaces of the aluminum disk are thereby polished.

A polyurethane type, suede type, nonwoven fabric type, or any other type polishing pad can be used.

In polishing, usually, a step called rough polishing for roughly scraping a surface of a target deeply using a polishing composition containing a polishing material having a large average particle size is performed. Subsequently, a step called finish polishing for gradually scraping the surface which has been roughly polished using a polishing composition containing a polishing material having a small average particle size is performed. The rough polishing step may include a plurality of polishing steps. The polishing composition according to an embodiment of the present invention can be preferably used in the rough polishing step.

EXAMPLES

Hereinafter, various embodiments will be specifically described based on Examples. However, the various embodiments are not limited to these Examples. It is needless to say that the various embodiments can be performed in various modes within the technical scope of the invention.

(Method for Preparing Polishing Composition)

Polishing compositions used in Examples 1 to 16 and Comparative Examples 1 to 9 contain materials indicated in Table 1 in the contents or addition amounts indicated in Table 1. Incidentally, in Table 1, acrylic acid is abbreviated as AA, acrylamide is abbreviated as AM, N-tert-butylacrylamide is abbreviated as TBAA, and 2-acrylamide-2-methylpropanesulfonic acid is abbreviated as ATBS. Results of the polishing test in Examples and Comparative Examples are indicated in Tables 2 and 3. Table 2 indicates a case where a water-soluble polymer compound in a polishing composition has a weight average molecular weight of 10,000. Table 3 indicates a case where a water-soluble polymer compound in a polishing composition has a weight average molecular weight of 100,000.

TABLE 1

| | Material used | Content in polishing composition | Experimental example used |
|---|---|---|---|
| Colloidal silica | Colloidal silica (commercially available product having an average particle size (D50): 51 nm was used) | 2.2% by mass | Examples 1 to 8 and 10 to 15, Comparative Examples 1 to 4 and 6 to 8 |
| | Colloidal silica (commercially available product having an average particle size (D50): 51 nm was used) | 3.3% by mass | Examples 9 and 16, Comparative Examples 5 and 9 |
| Wet-process silica | Wet-process silica (commercially available product having an average particle size (D50): 0.3 μm was used) | 2.2% by mass | Examples 1 to 8 and 10 to 15, Comparative Examples 1 to 4 and 6 to 8 |
| | Wet-process silica (commercially available product having an average particle size (D50): 0.3 μm was used) | 1.1% by mass | Examples 9 and 16, Comparative Examples 5 and 9 |
| Acid | Sulfuric acid (The amount indicated on the right was added as the amount for adjusting pH of polishing composition to 1.2) | 1.2% by mass | Examples 1 to 16, Comparative Examples 1 to 9 |
| Oxidizer | Hydrogen peroxide | 0.9% by mass | Examples 1 to 16, Comparative Examples 1 to 9 |
| Composition of water-soluble polymer compound/ weight average molecular weight | Synthesis number 1 Copolymer of AA/TBAA/ATBS = 84.5/15.0/0.5 (mol %), Weight average molecular weight = 10,000 | 0.02% by mass | Example 1 |
| | Synthesis number 1 Copolymer of AA/TBAA/ATBS = 84.5/15.0/0.5 (mol %), Weight average molecular weight = 10,000 | 0.04% by mass | Examples 2 and 9 |
| | Synthesis number 1 Copolymer of AA/TBAA/ATBS = 84.5/15.0/0.5 (mol %), Weight average molecular weight = 10,000 | 0.08% by mass | Example 3 |
| | Synthesis number 2 Copolymer of AA/TBAA/ATBS = 83.0/15.0/2.0 (mol %), Weight average molecular weight = 10,000 | 0.04% by mass | Example 4 |
| | Synthesis number 3 Copolymer of AA/AM/TBAA/ATBS = 84.5/2.0/13.0/0.5 (mol %), Weight average molecular weight = 10,000 | 0.04% by mass | Example 5 |
| | Synthesis number 4 Copolymer of AA/AM/TBAA/ATBS = 83.0/2.0/13.0/2.0 (mol %), Weight average molecular weight = 10,000 | 0.04% by mass | Example 6 |
| | Synthesis number 5 Copolymer of AA/TBAA/ATBS = 84.5/15.0/0.5 (mol %), Weight average molecular weight = 100,000 | 0.02% by mass | Example 10 |
| | Synthesis number 5 Copolymer of AA/TBAA/ATBS = 84.5/15.0/0.5 (mol %), Weight average molecular weight = 100,000 | 0.04% by mass | Examples 11 and 16 |
| | Synthesis number 5 Copolymer of AA/TBAA/ATBS = 84.5/15.0/0.5 (mol %), Weight average molecular weight = 100,000 | 0.08% by mass | Example 12 |
| | Synthesis number 6 Copolymer of AA/TBAA/ATBS = 83.0/15.0/2.0 (mol %), Weight average molecular weight = 100,000 | 0.04% by mass | Example 13 |
| | Synthesis number 7 Copolymer of AA/AM/TBAA/ATBS = 84.5/2.0/13.0/0.5 (mol %), Weight average molecular weight = 100,000 | 0.04% by mass | Example 14 |
| | Synthesis number 8 Copolymer of AA/AM/TBAA/ATBS = 83.0/2.0/13.0/2.0 (mol %), Weight average molecular weight = 100,000 | 0.04% by mass | Example 15 |
| | Synthesis number 9 Copolymer of AA/TBAA/ATBS = 89.5/10.0/0.5 (mol %), Weight average molecular weight = 10,000 | 0.04% by mass | Example 7 |
| | Synthesis number 10 Copolymer of AA/TBAA/ATBS = 88.0/10.0/2.0 (mol %), Weight average molecular weight = 10,000 | 0.04% by mass | Example 8 |
| | Synthesis number 11 Sodium polyacrylate, Weight average molecular weight = 10,000 | 0.04% by mass | Comparative Examples 1 and 5 |
| | Synthesis number 12 Copolymer of AA/TBAA = 85.0/15.0 (mol %), Weight average molecular weight = 10,000 | 0.04% by mass | Comparative Example 2 |
| | Synthesis number 13 Copolymer of AA/AM/TBAA = 85.0/2.0/13.0 (mol %), Weight average molecular weight = 10,000 | 0.04% by mass | Comparative Example 3 |
| | Synthesis number 14 Sodium polyacrylate, Weight average molecular weight = 100,000 | 0.04% by mass | Comparative Example 6 and 9 |
| | Synthesis number 15 Copolymer of AA/TBAA = 85.0/15.0 (mol %), Weight average molecular weight = 100,000 | 0.04% by mass | Comparative Example 7 |
| | Synthesis number 16 Copolymer of AA/AM/TBAA = 85.0/2.0/13.0 (mol %), Weight average molecular weight = 100,000 | 0.04% by mass | Comparative Example 8 |

TABLE 1-continued

| Material used | Content in polishing composition | Experimental example used |
|---|---|---|
| Synthesis number 17 Copolymer of AA/TBAA = 90.0/10.0 (mol %), Weight average molecular weight = 10,000 | 0.04% by mass | Comparative Example 4 |

AA: acrylic acid
AM: acrylamide
TBAA: N-tert-butylacrylamide
ATBS: 2-acrylamide-2-methylpropanesulfonic acid (Particle Size of Colloidal Silica)

A particle size (Heywood diameter) of colloidal silica was measured as a Heywood diameter (projected area equivalent circular diameter) by taking a photograph in a visual field at a magnitude of 100,000 with a transmission electron microscope (TEM) (manufactured by JEOL Ltd., transmission electron microscope JEM2000FX (200 kV)) and analyzing the photograph using an analysis software (manufactured by Mountech Co., Ltd., Mac-View Ver. 4.0). The average particle size of colloidal silica is an average particle size (D50) obtained by analyzing particle sizes of about 2000 particles of colloidal silica by the above method and calculating a particle size having 50% of an accumulated particle size distribution (based on accumulated volume) from a small particle size side using the above analysis software (manufactured by Mountech Co., Ltd., Mac-View Ver. 4.0).

(Particle Size of Wet-Process Silica)

An average particle size of wet-process silica particles was measured using a dynamic light scattering particle size distribution analyzer (manufactured by Nikkiso Co., Ltd., Microtrac UPA). The average particle size of the wet-process silica particles is an average particle size (D50) at which an accumulated particle size distribution from a small diameter side is 50% based on a volume.

(Weight Average Molecular Weight of Water-Soluble Polymer Compound)

The weight average molecular weight of the water-soluble polymer compound is measured in terms of polyacrylic acid by gel permeation chromatography (GPC), and GPC measurement conditions are described below.

(Gpc Conditions)

Column: G4000PWXL (manufactured by Tosoh Corporation)+G2500PWXL (manufactured by Tosoh Corporation)

Eluent: 0.2 M phosphoric acid buffer/acetonitrile=9/1 (volume ratio)

Flow rate: 1.0 ml/min

Temperature: 40° C.

Detection: 210 nm (UV)

Sample: concentration 5 mg/ml (injection amount 100 μl)

Polymer for calibration curve: polyacrylic acid molecular weight (peak top molecular weight: Mp) 115,000, 28,000, 4100, 1250 (Sowa Science Co., Ltd., American Polymer Standards Corp.)

(Polishing Conditions)

An electroless nickel-phosphorus plated aluminum disk having an outer diameter of 95 mm was polished as a polishing target under the following polishing conditions.

Polishing machine: manufactured by System Seiko Co., Ltd., 9B double-side polishing machine Polishing pad: manufactured by FILWEL Co., Ltd., P1 pad Surface plate rotating speed:
upper surface plate: −16.0 min$^{-1}$
lower surface plate 20.0 min$^{-1}$ Feed of polishing composition: 90 ml/min Polishing time: Polishing is performed until the polishing amount becomes 1.2 to 1.5 μm/one side.

(240 to 720 seconds)

Processing pressure: 120 kPa (Polishing Rate Ratio)

The mass of an aluminum disk which had been reduced after polishing was measured, and a polishing rate was calculated based on the following formula.

Polishing rate (μm/min)=mass of aluminum disk which decreased (g)/polishing time (min)/area of one side of aluminum disk (cm$^2$)/density of electroless nickel-phosphorus plated film (g/cm$^3$)/2×10$^4$ (Provided that, in the Above Formula, the Area of One Side of an Aluminum Disk was 65.9 cm$^2$, and the Density of an Electroless Nickel-Phosphorus Plated Film was 8.0 g/cm$^3$)

In Table 2, the polishing rate ratio is a relative value in a case where a polishing rate in Comparative Example 1 determined using the above formula is assumed to be 1 (reference). In Table 3, the polishing rate ratio is a relative value in a case where a polishing rate in Comparative Example 6 is assumed to be 1 (reference).

(Pit)

A pit was measured using a three-dimensional surface structure analyzing microscope utilizing a scanning white interference method, manufactured by Ametec Corporation. A pit was measured using a measurement device manufactured by Ametec Corporation (New View 8300 (lens: 1.4 times, zoom: 1.0 time)) and an analysis software (Mx) manufactured by Ametec Corporation. In an obtained shape profile, a case where a pit was hardly observed was evaluated as "A (good)". A case where a pit was observed slightly was evaluated as "B (acceptable)".

(Waviness)

Waviness of an aluminum disk was measured using a three-dimensional surface structure analyzing microscope utilizing a scanning white interference method, manufactured by Ametec Corporation. As measurement conditions, a measurement device manufactured by Ametec Corporation (New View 8300 (lens: 1.4 times, zoom: 1.0 time)), a wavelength of 100 to 500 μm, and a measurement area of 6 mm×6 mm were used, and analysis was performed using an analysis software (Mx) manufactured by Ametec Corporation.

(Roll-Off Ratio)

As evaluation of an edge shape, roll-off with a numerical value of the degree of edge rounding was measured. Roll-off was measured using a measurement device manufactured by Ametec Corporation (New View 8300 (lens: 1.4 times, zoom: 1.0 time)) and an analysis software (Mx) manufactured by Ametec Corporation.

A method for measuring roll-off will be described with reference to FIG. 1. FIG. 1 illustrates a cross-sectional view of an electroless nickel-phosphorus plated aluminum disk having an outer diameter of 95 mm as a polishing target, perpendicular to a polished surface passing through the center of the disk. In order to measure roll-off, perpendicular line h was first drawn along an edge of circumference of a disk, line j parallel to perpendicular line h and having a distance of 3.92 mm from perpendicular line h was drawn toward the center of the disk on a polished surface from perpendicular line h, and a position where a line of a cross section of the disk intersected line j was defined as point A. In addition, line k parallel to perpendicular line h and having a distance of 0.32 mm from perpendicular line h was drawn, and a position where the line of the cross section of the disk intersected line k was defined as point B. Line m connecting between points A and B was drawn, line t perpendicular to line m was further drawn, a position where the line of the cross section of the disk intersected line t was defined as point C, and a position where line m intersected line t was defined as point D. In addition, a distance where a distance between points C and D was the maximum was measured as roll-off.

In Table 2, the roll-off ratio is a relative value in a case where roll-off in Comparative Example 1 measured using the above method is assumed to be 1 (reference). In Table 3, the roll-off ratio is a relative value in a case where roll-off in Comparative Example 6 is assumed to be 1 (reference).

TABLE 2

| Experimental example | Colloidal silica D50 (nm) | Colloidal silica Content (% by mass) | Wet-process silica Average particle size (μm) | Wet-process silica Content (% by mass) | Water-soluble polymer compound Kind | Water-soluble polymer compound MW | Addition amount (% by mass) | pH (25° C.) | Polishing rate ratio (Comparative Example 1 = 1) | Pit | Waviness (Å) | Roll-off ratio (Comparative Example 1 = 1) |
|---|---|---|---|---|---|---|---|---|---|---|---|---|
| Example 1 | 51 | 2.2 | 0.3 | 2.2 | Synthesis number 1 | 10,000 | 0.02 | 1.2 | 1.09 | A | 1.76 | 0.68 |
| Example 2 | 51 | 2.2 | 0.3 | 2.2 | Synthesis number 1 | 10,000 | 0.04 | 1.2 | 1.08 | A | 1.71 | 0.63 |
| Example 3 | 51 | 2.2 | 0.3 | 2.2 | Synthesis number 1 | 10,000 | 0.08 | 1.2 | 1.09 | A | 1.73 | 0.61 |
| Example 4 | 51 | 2.2 | 0.3 | 2.2 | Synthesis number 2 | 10,000 | 0.04 | 1.2 | 1.09 | A | 1.72 | 0.65 |
| Example 5 | 51 | 2.2 | 0.3 | 2.2 | Synthesis number 3 | 10,000 | 0.04 | 1.2 | 1.09 | A | 1.73 | 0.48 |
| Example 6 | 51 | 2.2 | 0.3 | 2.2 | Synthesis number 4 | 10,000 | 0.04 | 1.2 | 1.08 | A | 1.70 | 0.51 |
| Example 7 | 51 | 2.2 | 0.3 | 2.2 | Synthesis number 9 | 10,000 | 0.04 | 1.2 | 1.08 | A | 1.72 | 0.8 |
| Example 8 | 51 | 2.2 | 0.3 | 2.2 | Synthesis number 10 | 10,000 | 0.04 | 1.2 | 1.08 | A | 1.75 | 0.83 |
| Example 9 | 51 | 3.3 | 0.3 | 1.1 | Synthesis number 1 | 10,000 | 0.04 | 1.2 | 0.81 | A | 1.61 | 1.02 |
| Comparative Example 1 | 51 | 2.2 | 0.3 | 2.2 | Synthesis number 11 | 10,000 | 0.04 | 1.2 | 1 | A | 1.90 | 1 |
| Comparative Example 2 | 51 | 2.2 | 0.3 | 2.2 | Synthesis number 12 | 10,000 | 0.04 | 1.2 | 1.08 | A | 1.94 | 0.63 |
| Comparative Example 3 | 51 | 2.2 | 0.3 | 2.2 | Synthesis number 13 | 10,000 | 0.04 | 1.2 | 1.09 | A | 1.91 | 0.51 |
| Comparative Example 4 | 51 | 2.2 | 0.3 | 2.2 | Synthesis number 17 | 10,000 | 0.04 | 1.2 | 1.04 | A | 1.92 | 0.81 |
| Comparative Example 5 | 51 | 3.3 | 0.3 | 1.1 | Synthesis number 11 | 10,000 | 0.04 | 1.2 | 0.75 | A | 1.76 | 1.47 |

TABLE 3

| Experimental example | Colloidal silica D50 (nm) | Colloidal silica Content (% by mass) | Wet-process silica Average particle size (μm) | Wet-process silica Content (% by mass) | Water-soluble polymer compound Kind | Water-soluble polymer compound MW | Addition amount (% by mass) | pH (25° C.) | Polishing rate ratio (Comparative Example 6 = 1) | Pit | Waviness (Å) | Roll-off ratio (Comparative Example 6 = 1) |
|---|---|---|---|---|---|---|---|---|---|---|---|---|
| Example 10 | 51 | 2.2 | 0.3 | 2.2 | Synthesis number 5 | 100,000 | 0.02 | 1.2 | 1.07 | A | 1.76 | 0.74 |
| Example 11 | 51 | 2.2 | 0.3 | 2.2 | Synthesis number 5 | 100,000 | 0.04 | 1.2 | 1.09 | A | 1.74 | 0.68 |
| Example 12 | 51 | 2.2 | 0.3 | 2.2 | Synthesis number 5 | 100,000 | 0.08 | 1.2 | 1.07 | A | 1.74 | 0.65 |
| Example 13 | 51 | 2.2 | 0.3 | 2.2 | Synthesis number 6 | 100,000 | 0.04 | 1.2 | 1.07 | A | 1.71 | 0.71 |
| Example 14 | 51 | 2.2 | 0.3 | 2.2 | Synthesis number 7 | 100,000 | 0.04 | 1.2 | 1.08 | A | 1.73 | 0.56 |

TABLE 3-continued

| | Colloidal silica | | Wet-process silica Average | | Water-soluble polymer compound | | | | Polishing | | | |
|---|---|---|---|---|---|---|---|---|---|---|---|---|
| Experimental example | D50 (nm) | Content (% by mass) | particle size (μm) | Content (% by mass) | Kind | MW | Addition amount (% by mass) | pH (25° C.) | rate ratio (Comparative Example 6 = 1) | Pit | Waviness (Å) | Roll-off ratio (Comparative Example 6 = 1) |
| Example 15 | 51 | 2.2 | 0.3 | 2.2 | Synthesis number 8 | 100,000 | 0.04 | 1.2 | 1.07 | A | 1.72 | 0.53 |
| Example 16 | 51 | 3.3 | 0.3 | 1.1 | Synthesis number 5 | 100,000 | 0.04 | 1.2 | 0.83 | A | 1.64 | 1.05 |
| Comparative Example 6 | 51 | 2.2 | 0.3 | 2.2 | Synthesis number 14 | 100,000 | 0.04 | 1.2 | 1 | A | 1.93 | 1 |
| Comparative Example 7 | 51 | 2.2 | 0.3 | 2.2 | Synthesis number 15 | 100,000 | 0.04 | 1.2 | 1.07 | A | 1.96 | 0.68 |
| Comparative Example 8 | 51 | 2.2 | 0.3 | 2.2 | Synthesis number 16 | 100,000 | 0.04 | 1.2 | 1.08 | A | 1.94 | 0.57 |
| Comparative Example 9 | 51 | 3.3 | 0.3 | 1.1 | Synthesis number 14 | 100,000 | 0.04 | 1.2 | 0.78 | A | 1.78 | 1.51 |

(Discussion)

Table 2 indicates results in a case where a water-soluble polymer compound in a polishing composition has a weight average molecular weight of 10,000. In Examples 1 to 9 using a copolymer containing a monomer having a carboxylic acid group, a monomer having an amide group, and a monomer having a sulfonic acid group, a balance among a polishing rate, a pit, waviness, and roll-off is superior to each of Comparative Examples using a homopolymer containing a monomer having a carboxylic acid group (Comparative Examples 1 and 5), and a copolymer containing no monomer having a sulfonic acid group (Comparative Examples 2 to 4).

In addition, Table 3 indicates results in a case where a water-soluble polymer compound in a polishing composition has a weight average molecular weight of 100,000. In Examples 10 to 16 using a copolymer containing a monomer having a carboxylic acid group, a monomer having an amide group, and a monomer having a sulfonic acid group, a balance among a polishing rate, a pit, waviness, and roll-off is superior to each of Comparative Examples using a homopolymer containing a monomer having a carboxylic acid group (Comparative Examples 6 and 9), and a copolymer containing no monomer having a sulfonic acid group (Comparative Examples 7 and 8).

As is apparent from the above, use of a copolymer containing a monomer having a carboxylic acid group, a monomer having an amide group, and a monomer having a sulfonic acid group as a water-soluble polymer compound in a polishing composition can make a balance among a polishing rate, a pit, a waviness, and roll-off favorable.

The polishing composition according to an embodiment can be used for polishing an electronic component such as a semiconductor or a magnetic recording medium including a hard disk. Particularly, the polishing composition can be used for polishing a surface of a substrate for a magnetic recording medium such as a glass magnetic disk substrate or an aluminum magnetic disk substrate. Furthermore, the polishing composition can be used for polishing a surface of an aluminum magnetic disk substrate for a magnetic recording medium, having an electroless nickel-phosphorus plated film formed on a surface of an aluminum alloy substrate.

What is claimed is:

1. A polishing composition for a magnetic disk substrate, comprising:
    colloidal silica;
    pulverized wet-process silica particles;
    a water-soluble polymer compound; and
    water,
    wherein the water-soluble polymer compound is a copolymer containing a monomer having a carboxylic acid group, a monomer having an amide group, and a monomer having a sulfonic acid group as essential monomers, and
    wherein the water-soluble polymer compound has a ratio of structural units derived from the monomer having a carboxylic acid group of 50 to 95 mol %, a ratio of structural units derived from the monomer having an amide group of 1 to 40 mol %, and a ratio of structural units derived from the monomer having a sulfonic acid group of 0.01 to 20 mol %, of the molar concentration of the copolymer.

2. The polishing composition for a magnetic disk substrate according to claim 1, wherein the colloidal silica has an average particle size (D50) of 5 to 200 nm, and the wet-process silica particles have an average particle size of 0.2 to 1.0 μm.

3. The polishing composition for a magnetic disk substrate according to claim 1, wherein a value of a ratio of the average particle size of the wet-process silica particles with respect to the average particle size of the colloidal silica is from 2.0 to 30.0.

4. The polishing composition for a magnetic disk substrate according to claim 1, wherein a total concentration of the colloidal silica and the wet-process silica particles is from 1 to 50% by mass, and a ratio of the colloidal silica is from 5 to 95% by mass and a ratio of the wet-process silica particles is from 5 to 95% by mass with respect to the total mass of the colloidal silica and the wet-process silica particles.

5. The polishing composition for a magnetic disk substrate according to claim 1, wherein the monomer having a carboxylic acid group is selected from the group consisting of acrylic acid, an acrylate, methacrylic acid, and a methacrylate.

6. The polishing composition for a magnetic disk substrate according to claim 1, wherein the monomer having an amide group is at least one selected from the group consisting of acrylamide, methacrylamide, N-alkylacrylamide, and N-alkylmethacrylamide.

7. The polishing composition for a magnetic disk substrate according to claim 1, wherein the monomer having a sulfonic acid group is selected from the group consisting of isoprenesulfonic acid, 2-acrylamide-2-methylpropanesulfonic acid, 2-methacrylamide-2-methylpropanesulfonic acid, styrenesulfonic acid, vinylsulfonic acid, allylsulfonic acid, isoamylenesulfonic acid, vinylnaphthalenesulfonic acid, and salts thereof.

8. The polishing composition for a magnetic disk substrate according to claim 1, wherein the water-soluble polymer compound has a weight average molecular weight of 1,000 to 1,000,000.

9. The polishing composition for a magnetic disk substrate according to claim 1, wherein the water-soluble polymer compound has a content of 0.0001 to 2.0% by mass.

10. The polishing composition for a magnetic disk substrate according to claim 1, further comprising:
   at least one of an acid and a salt thereof, and having a pH value at 25° C. of 0.1 to 4.0.

11. The polishing composition for a magnetic disk substrate according to claim 1, further comprising:
   an oxidizer.

12. The polishing composition for a magnetic disk substrate according to claim 1, used for polishing an electroless nickel-phosphorus plated aluminum magnetic disk substrate.

* * * * *